Sept. 4, 1962 A. DOWLEY 3,052,007
APPARATUS ADAPTED FOR USE IN AFFIXING HANDLES IN THE
MANUFACTURE OF ARTICLES OF CERAMIC WARE
Filed June 2, 1960 10 Sheets-Sheet 1

Sept. 4, 1962　　　　　　A. DOWLEY　　　　　3,052,007
APPARATUS ADAPTED FOR USE IN AFFIXING HANDLES IN THE
MANUFACTURE OF ARTICLES OF CERAMIC WARE
Filed June 2, 1960　　　　　　　　　　　　　10 Sheets-Sheet 5

Sept. 4, 1962
A. DOWLEY
3,052,007
APPARATUS ADAPTED FOR USE IN AFFIXING HANDLES IN THE
MANUFACTURE OF ARTICLES OF CERAMIC WARE
Filed June 2, 1960

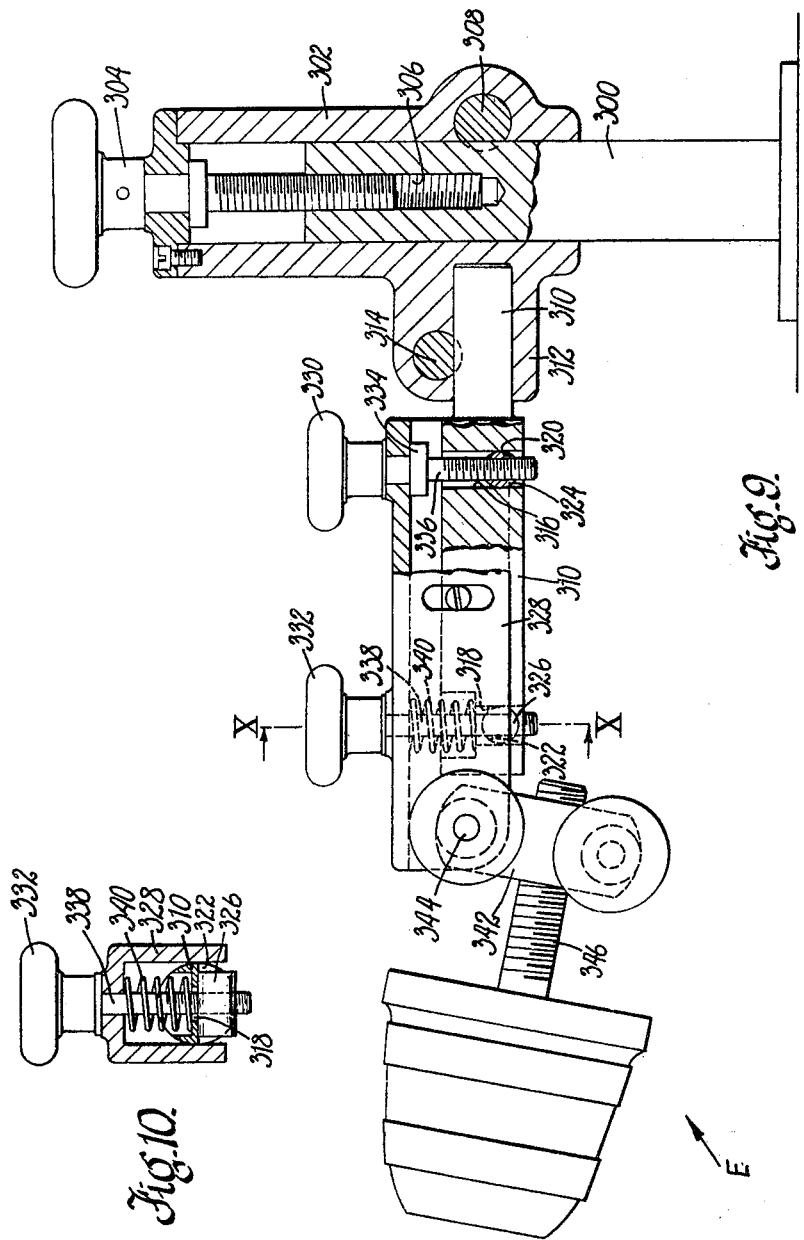

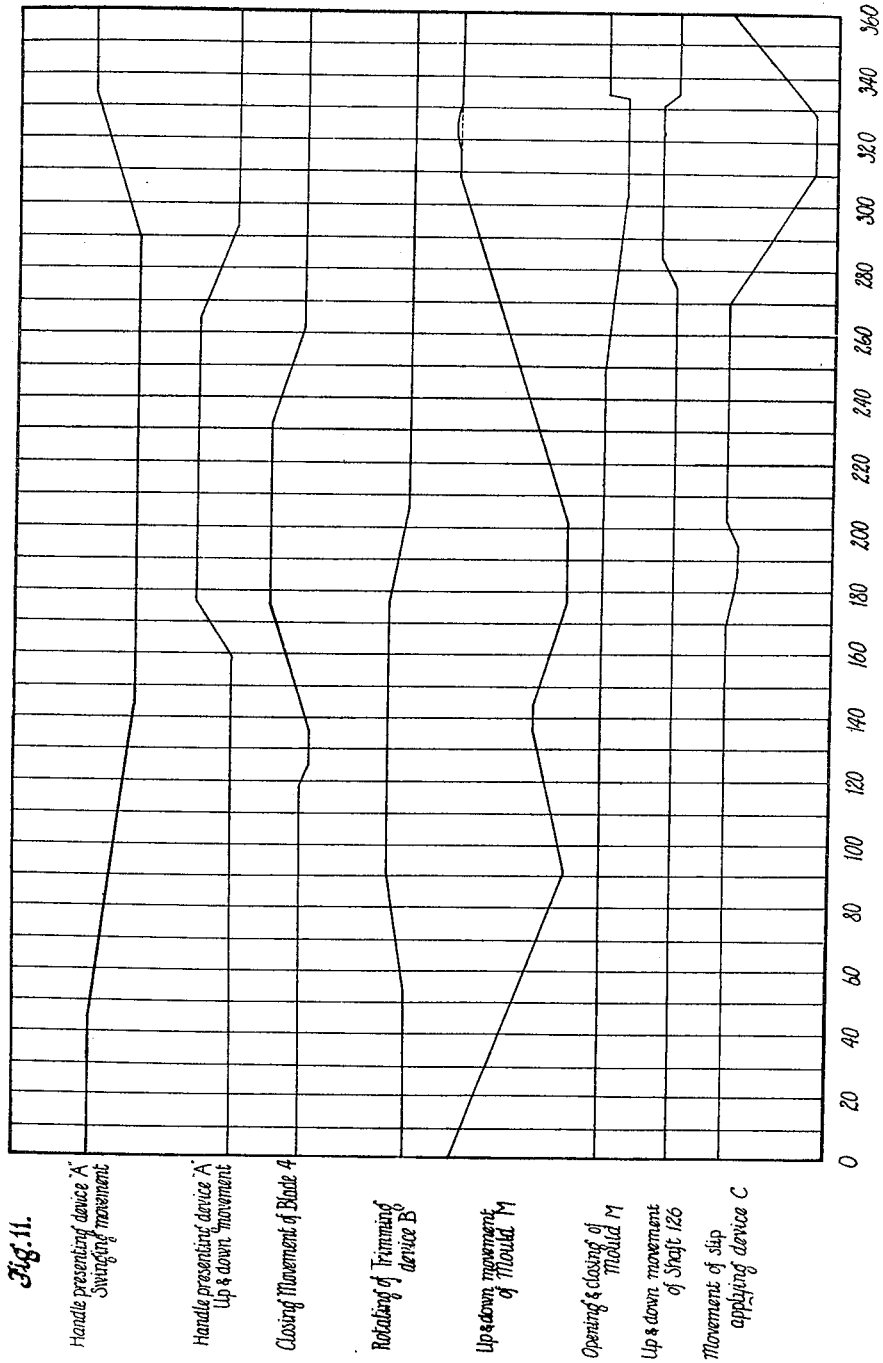

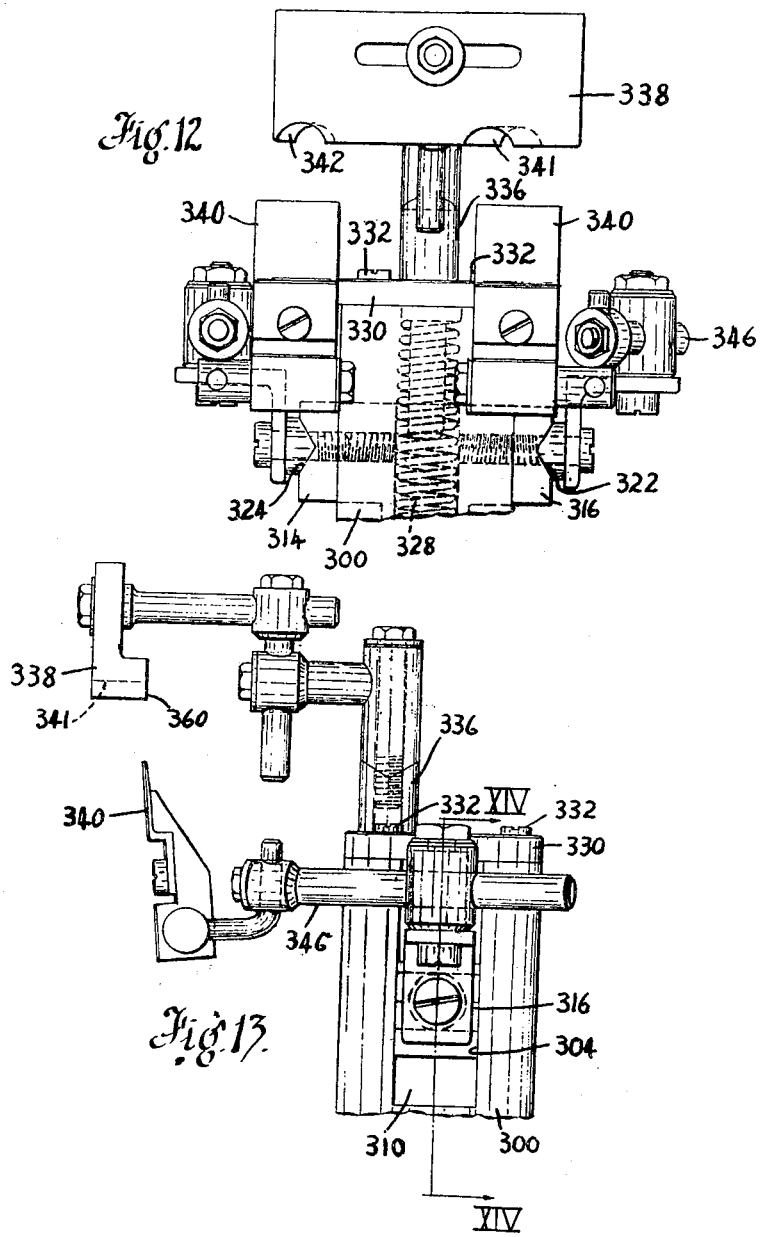

United States Patent Office 3,052,007
Patented Sept. 4, 1962

3,052,007
APPARATUS ADAPTED FOR USE IN AFFIXING HANDLES IN THE MANUFACTURE OF ARTICLES OF CERAMIC WARE
Arthur Dowley, Stoke-on-Trent, England, assignor to Service (Engineers) Limited, Stoke-on-Trent, England, a British company
Filed June 2, 1960, Ser. No. 33,466
4 Claims. (Cl. 25—22)

This invention is concerned with improvements in or relating to the preparation and affixment of handles to body portions in the production of articles of ceramic ware. The phrase "ceramic ware" is used herein to denote articles made by shaping a material having a clay basis, and subjecting the shaped material to firing at a high temperature to make it water resistant, and includes earthenware and china.

The invention will be described hereinafter, by way of example, with reference to the preparation of a handle and the affixment thereof to the body portion of a cup: it will be realized that the invention also relates to the affixment of handles to the body portions of bowls, dishes, jugs and the like. In the manufacture of an earthenware cup by one common procedure, a moist material having a clay basis is first shaped in a mould to provide a body portion for the cup of a required shape, and then dried. The material is then in a fragile condition, having little or no water resistance. A preformed, trimmed, handle is then affixed to the body portion by the use of sticking up slip, and the body portion with the affixed handle is then fired at about 1100° C. to provide an article which is comparatively strong and water resistant. After this article has been freed from dust it is ornamented if required, and then glazed.

Handle blanks for use in the above procedure are usually cast from slip, and are trimmed before affixment to the cup body portion to provide at each of the localities at which the trimmed blank will be affixed to the body portion a face suitable for such affixment. In affixing a trimmed blank to a body portion of a cup it is usual manually to place the trimmed blank in a mould of a handle attaching apparatus, for example an apparatus as described in U.S. specification No. 2,623,258, and by the use of the apparatus to affix the trimmed blank to the body portion. It will be realized that prior to firing the blank is, like the body portion of the cup, in a fragile condition, and wastage through breakage of blanks during manual handling is common.

One of the various objects of the present invention is to provide an apparatus adapted for use in affixing a handle to a body portion in the manufacture of an article of ceramic ware in which manual handling of the handle blank is reduced.

It has been proposed to reduce manual handling of the blank by using an apparatus in which one and the same mould holds the blank for trimming and for affixing it to a body portion. Such an apparatus suffers from the following disadvantages: if the mould holds the blank sufficiently closely to ensure accurate location for trimming, there is a tendency when the mould is opened away from the blank after attachment to the body portion for the blank to be moved out of correct position: it will be realized that the blank is comparatively loosely attached to the body portion at this stage by the sticking up slip. However, if the mould is sufficiently loose to allow for easy removal of the mould from the attached blank, difficulty is experienced in obtaining consistent location of blanks for trimming.

Another of the various objects of the present invention is to provide an apparatus adapted for use in affixing a handle to a body portion in the manufacture of an article of ceramic ware in which a handle blank is trimmed while held in one mould and then transferred to another mould for affixment to the body portion.

An apparatus is hereinafter described to illustrate the invention by way of example. This illustrative apparatus is adapted for use in the production of a cup and comprises a presenting device comprising an open topped positioning mould in which in the operation of the apparatus an operator locates a handle blank, trimming means in the form of a trimming device comprising opposed blades and arranged to take a handle blank presented to it by the presenting device and to trim it, a slip applying device, a handle applying device comprising an attaching mould to which a blank trimmed by the trimming device is transferred and which holds the trimmed blank while it is affixed to a body portion, and a cup chuck on which the body portion is supported.

In the operation of the illustrative apparatus an operator positions an unfired cup body portion on the chuck and locates an unfired untrimmed handle blank in the mould of the presenting device when said device is in a loading position; the presenting device then retires from its loading position and presents the handle blank to the trimming device, end portions of the blank being located between the blades which then engage the blank, moving to a partly closed position and partially severing the blank; the blank is thus supported solely by such engagement of the trimming device. The presenting device then retires from the trimming device leaving the blank supported thereby. The trimming device trims the blank and transfers it to the attaching mould; the blades of the trimming device are so arranged that when closed together they provide a contour corresponding to the contour of the cup body portion at localities on said body portion where the handle is to be fixed; it will be realized that the position taken up by the presenting device determines the localities on the blank at which the trimming device engages the blank. The trimming device transports the handle blank supported between the partly closed blades into position over the attaching mould of the applying device and the blades are then caused to close so that they trim the end portions of the blank and the trimmed blank is thereby supplied to the attaching mould and positioned therein. The slip applying device then applies slip to the end portions of the trimmed blank, and the handle applying device causes the mould to move into a closed condition and to apply and affix the blank to the cup body portion on the chuck.

The attaching mould is movable between an open condition, in which it receives the trimmed blank from the trimming device, and a closed condition, in which it holds the blank.

The illustrative apparatus is so arranged that in one cycle of its operation one blank is trimmed by the trimming device, positioned in the attaching mould and affixed to a body portion while a succeeding blank is located in the presenting device and presented to the trimming device.

An alternative form of construction of the trimming device is also described.

There now follows a detailed description, to be read with reference to the accompanying drawings, of the illustrative apparatus; it is to be realized that this illustrative apparatus has been selected for description by way of example of the invention only, and not by way of limitation thereof.

In the accompanying drawings:

FIGURE 4A shows a plan view of certain of the parts shown in FIGURES 3 and 4;

FIGURE 9 shows a cup chuck of the illustrative apparatus;

FIGURE 10 shows a view in section taken along the line X—X of FIGURE 9;

FIGURE 11 is a timing diagram of various parts of the illustrative apparatus;

FIGURE 12 shows a front view of an alternative construction of trimming device;

FIGURE 13 shows a side view of the device of FIGURE 12;

Figure 1:
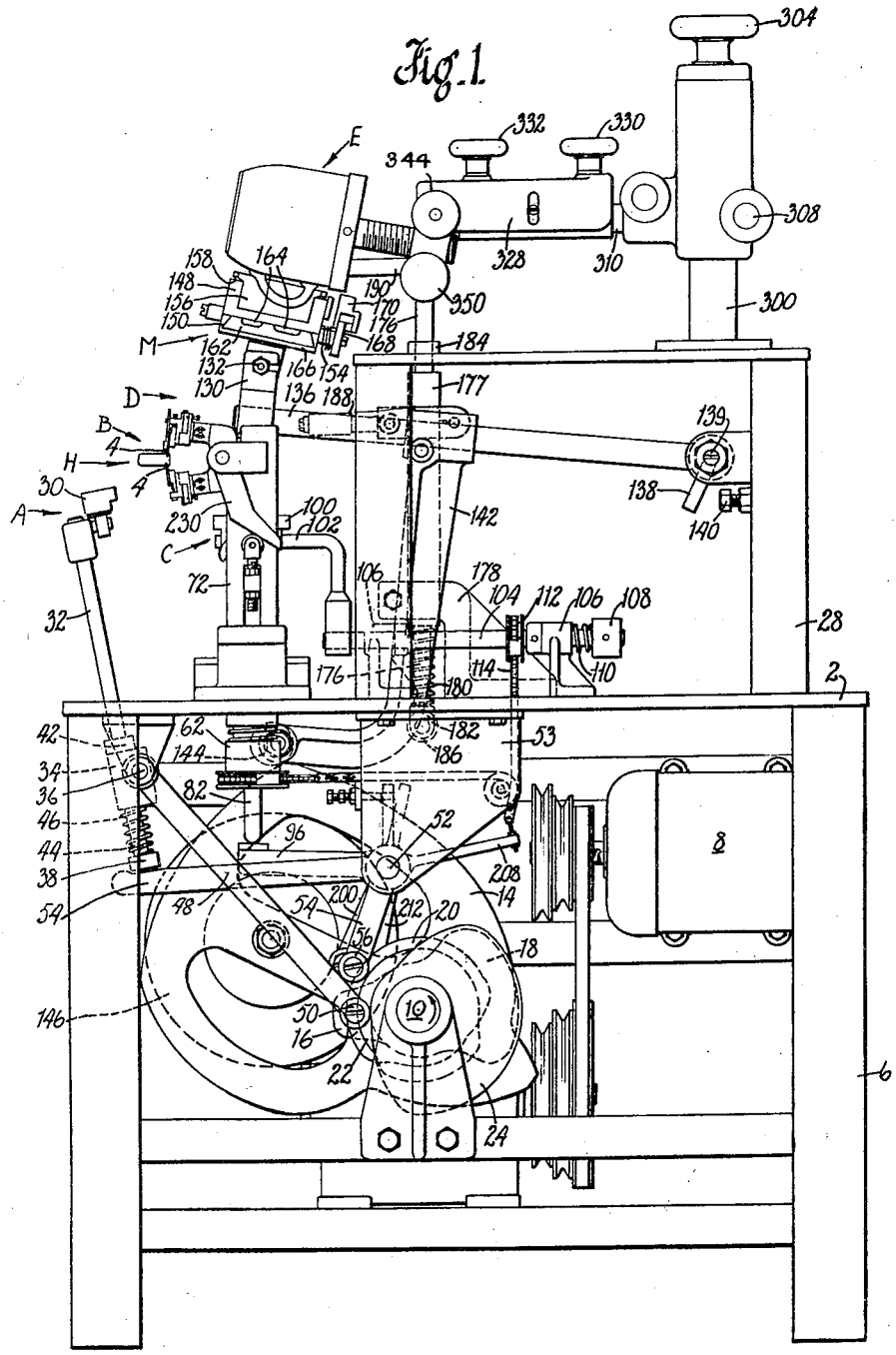
FIGURE 1 shows a side view of the illustrative apparatus.

The illustrative apparatus (FIGURES 1 and 2) is an apparatus adapted for use in the production of a cup and comprises a presenting device A comprising an open topped positioning mould 30, in which in the operation of the apparatus an operator locates a handle blank, trimming means in the form of a trimming device B comprising opposed blades 4, and arranged to take a blank presented to it by the presenting device and to trim it, a slip applying device C, a handle applying device D comprising an attaching mould M to which a blank trimmed by the trimming device is transferred and which holds the trimmed blank while it is affixed to a body portion, and a cup chuck E on which the body portion is supported.

In the operation of the illustrative apparatus an operator positions an unfired cup body portion on the chuck E and locates an unfired untrimmed handle blank H in the mould 30 of the presenting device A when the device is in a loading position. The device A then retires from the loading position into a presenting position and presents the blank H to the trimming device B, end portions of the blank H being located between the blades 4 of the device B. The trimming device B is remote from the loading position: the blades 4 then engage the blank H, moving to a partly closed position and partially severing the blank H; the blank is thus suported solely by such engagement of the trimming device B; it will be realized that the localities on the blank at which the blades 4 cut into it are determined by the position of the positioning mould 30. The presenting device A then retires from the trimming device B, leaving the blank H supported by the trimming device. The trimming device B trims the blank H and transfers it to the attaching mould M. The blades 4 of the trimming device B are so arranged that when closed together they provide a contour corresponding to the contour of the cup body portion at localities on said portion where the trimmed handle blank H is to be affixed. The trimming device B with the handle blank H supported between the partly closed blades 4 rotates about a vertical axis, transporting the supported blank into position over the attaching mould M. The blades 4 are then caused to close so that they trim the end portions of the blank H, and the trimmed blank is supplied to the mould M and positioned therein, no longer being supported by the trimming device B: the mould M is movable between an open condition, in which it receives the trimmed blank from the trimming device, and a closed condition, in which it holds the blank. The end portions of the blank are trimmed to said contour corresponding to the contour of the body portion: the slip applying device C then applies slip to the end portions of the trimmed blank, and the applying device D causes the mould M to move into its closed condition and to apply and affix the blank to the cup body portion on the chuck E.

The illustrative apparatus comprises a main frame 6 which supports a table 2 on which is mounted a head frame 28. Supported in the frame 6 is an electric motor 8 which drives a main shaft 10 through a reduction gear 12. The shaft 10 is supported in the frame 6 and has fixed on it six cams 14, 16, 18, 20, 22 and 24. As will hereinafter become apparent the cam 14 causes movement of the handle applying device D, cam 16 causes movement of the slip applying device C, cams 18 and 20 cause movement of the trimming device B and cams 22 and 24 cause movement of the handle presenting device A. The open topped positioning mould 30 of the device A is mounted towards an upper end of a rod 32. The mould 30 comprises a recess 26 which is adapted accurately to locate an untrimmed handle blank therein. The rod 32 is slidably mounted in a block 34 which is fixed to a shaft 36 which is rotatably mounted in two trunnions 37, 37, fixed to the frame 6. A torsion spring 39 acts between a collar 41 fixed towards one end of the shaft 36 and one of the trunnions 37 (FIGURE 2) and urges the shaft 36 anticlockwise (viewing FIGURE 1). A block 38 is secured to a lower end portion of the rod 32, and a smaller block 42 is secured to the rod 32 above the block 34. A second, short, rod 44 has an upper end portion secured in the block 42 and passes, parallel to the rod 32, slidably through the block 34 and has its lower end portion secured in the block 38. Two springs 40, 46 act between the blocks 34, and 38, surrounding the rods 32 and 44 respectively, and serve to urge the block 42 and the rod 32 downwards. Also fixed to the shaft 36 is a cam lever 48 on a lower end portion of which is mounted a cam roll 50 which bears against the cam 24. Pivoted on a shaft 52 fixed in trunnions 53 in the frame 6 is an L-shaped arm member 54 one end portion of which engages the block 38 and the other end portion of which carries a cam roll 56 which bears against the cam 22. In one cycle of operation of the illustrative apparatus the cam 24 causes the device A to retire against the action of the spring 39 from its loading position into its presenting position and back to its loading position and the cam 22 causes the mould 30 to move up and down again when the device A is in presenting position (see FIGURE 11).

The trimming device B (FIGURES 3 and 4) comprises a sleeve 58 mounted in a vertical bearing 60 which is fixed to the table 2. The sleeve 58 passes through the table and has fixed towards its lower end a pulley 62. A torsion spring 64 acts between the pulley 62 and the bearing 60, and urges the pulley 62 and thus the sleeve 58 anticlockwise (viewed from above). The sleeve 58 comprises a flange 68 toward its upper end, and a ball race 66 is positioned in a recess in an upper end portion of the bearing 60 between the flange 68 and the bearing 60. Fixed to the sleeves 58 by two screws 70, 70 is a hollow supporting member 72, which comprises two vertical slots 74, 76 formed at opposite sides thereof, and two bearing arms 78, 80 above the slots 74, 76 respectively. Slidably mounted in the sleeve 58 and extending therethrough into the inside of the member 72 is an actuating rod 82, which has a cross member 84 fixed to its upper end portion, end portions of the member 84 extending outwards through the slots 74, 76. A spring 86 acts between the member 84 and an end portion 73 of the member 72 to urge the rod 82 and cross member 84 downwards. Secured in the end portions of the cross member 84 opposite the slots 74, 76 respectively and outside the supporting member 72 are two screwed rods 88, 90, which support towards their upper ends cam rolls 92, 94 respectively.

The lower end of the rod 82 abuts against one arm 96 of a cam lever 98, which lever comprises another arm 200, having a cam roll 202 mounted thereon, and a third arm 99. The lever 98 is pivoted on the shaft 52; the roll 202 is adapted to bear, in the operation of the ilustrative apparatus, against the cam 20; the arm 99 is adapted to abut, in the operation of the apparatus, against a stop screw 201 which is screwed into a bar 220 being fixed across the two trunnions 53, 53. Attached to the periphery of the pulley 62, and extending part way round the pulley, is a chain 204 which extends over a sprocket 206 mounted between the trunnions 53 to an arm 208 of a cam lever 210, which lever comprises another arm 212, which supports a cam roll 214 adapted to bear against the cam 18, and a third arm 216 which is also adapted to bear against a stop crew 218 secured in the bar 220.

Figure 4:
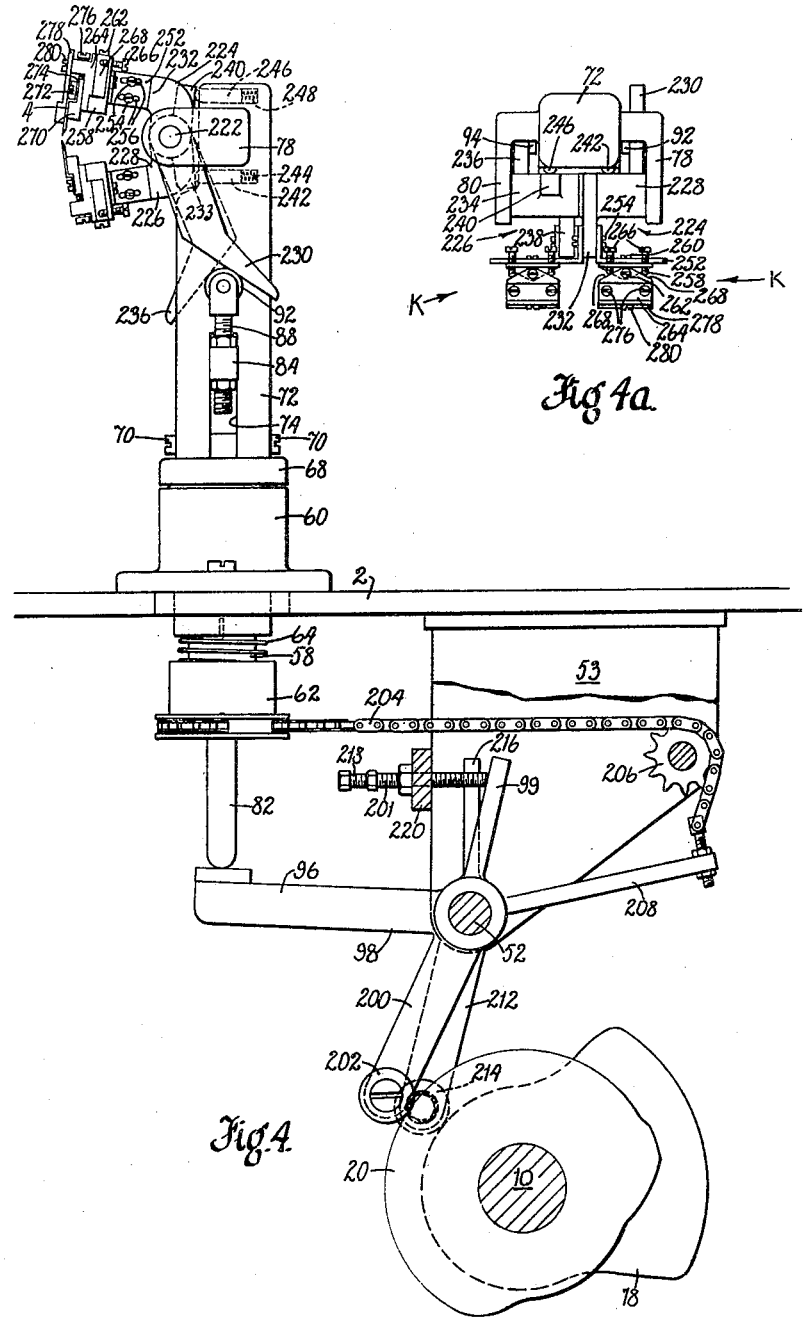
FIGURE 4 shows a side view of the trimming device.

A shaft 222 is fixed between the bearing arms 78 and 80 (FIGURES 4 and 7) and has two supporting members 224, 226 pivoted thereon. The supporting member 224 comprises a cylindrical portion 228 which is rotatably mounted on the shaft 222, a downwardly extending cam arm 230 which is arranged to engage the cam roll 92, an upwardly extending arm 232 and a downwardly extending lug 233 (FIGURE 4). The supporting member 226 comprises a cylindrical portion 234 which is rotatably mounted on the shaft 222, a downwardly extending cam arm 236 which is arranged to engage the cam roll 94, a downwardly extending arm 238 and an upwardly extending lug 240. A plunger 242 mounted in the member 72 is urged by a spring 244 against the lug 233; a plunger 246 mounted in the member 72 is urged by a spring 248 against the lug 240; the two arms 232, 238 are thus urged towards each other by the springs 244, 248.

Figure 7:
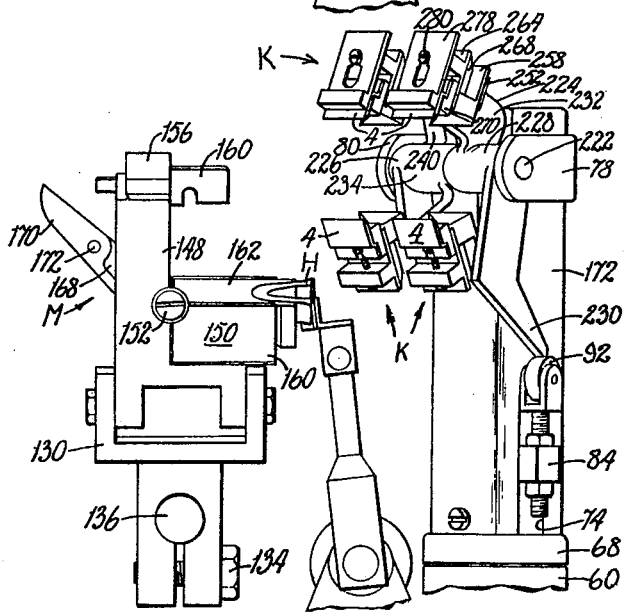
Figure 8:
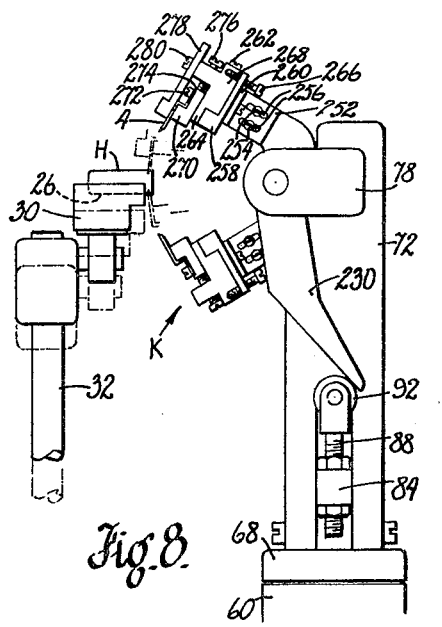
FIGURE 8 shows a handle presenting device and the trimming device of the illustrative apparatus at one stage of operation.

The blades 4 are adjustably mounted on the supporting members 224, 226 in supporting heads K now to be described, with particular reference to FIGURES 3, 4, 4A and 7. The heads K are arranged in pairs so that two upper blades 4 oppose two lower blades 4, the upper blades 4 being mounted in heads K mounted on the member 224 and the lower blades 4 in heads K mounted on the member 26. One of the heads K supporting one of the upper blades 4 will now be described. The head K comprises an L-shaped supporting plate 252 secured to the member 226. One of the heads K supporting one of 256 in one limb of the plate 252 (FIGURE 8). The other limb of the plate 252 also has a longitudinal slot therein and a pivot block 258, which comprises a small stud adapted to be mounted in said slot, is secured to the plate 252 by a screw 260 which is screwed into said stud. It will be realized that the plate 252 is adjustable lengthwise of the arm 232, and that the pivot block 258 is adjustable across the plate 252.

Figure 3:
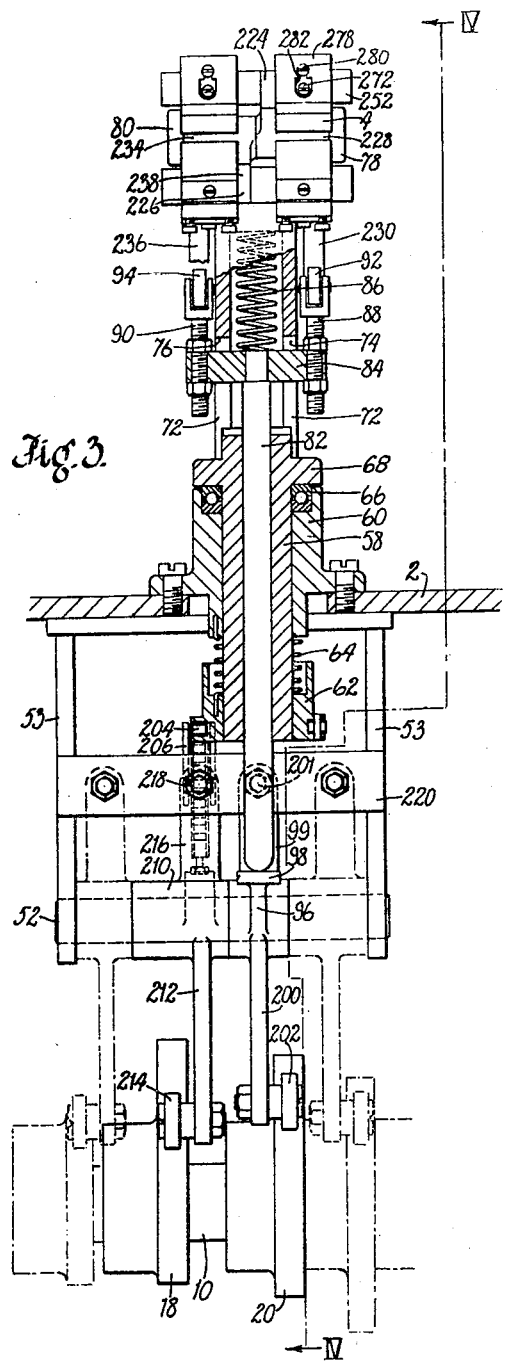
FIGURE 3 shows a front view, partly in section, of a trimming device of the illustrative apparatus.

Pivoted to the block 258 by a screw 262 is another pivot block 264. Two screws 266 are screwed into the block 258 and are adapted to engage inclined faces 268 of the block 264 and thus to determine the angular relationship between the two pivot blocks 258, 264. A blade supporting block 270 and the blade 4 are secured to the pivot block 264 by a screw 272 (FIGURE 8); the block 270 and the blade 4 are slotted in such a manner that they are adjustable up and down relative to the block 264; a small lip 274 of the block 270 prevents relative movement between the blade 4 and the block 270. Two screws 276 screwed into the block 264 assist in up and down adjustment of the block 270 and the blade 4. A clamping member 278 is adjustably secured to the pivot block 264 by a screw 280 passing through a slot in the member 278, and assists in supporting the blade 4 in the operation of the illustrative apparatus. An opening 282 in the member 278 allows ready access to the screw 272 (FIGURES 3 and 7).

It will be realized from the foregoing description of the head K that the blade 4 of said head is adjustable relatively to the supporting member 72, (a) Backwards and forwards by means of the screws 254;
(b) Transversely by means of the screw 260;
(c) Angularly by means of the screws 266; and
(d) Up and down by means of the screws 272, 276.

The other upper blade supporting head K is of substantially the same construction: the two lower blade supporting heads K are similar but do not incorporate any clamping member such as 278. It will be realized that the blades 4 are adjustable in such a manner that, having been adjusted and the illustrative apparatus being in use, they trim the blank H to a contour corresponding to the contour of the cup body portion at localities on said body portion where the blank is to be affixed. In particular, it is usually desirable to position the blades 4 so that their distances from the axis of the shaft 222 are approximately equal to the radius of the cup body portion at the localities at which the respective end portions of the trimmed handle are to be applied.

The slip applying device C (FIGURES 1 and 2) comprises an applying pad 100 fixed on a cranked arm 102. The arm 102 is fixed towards one end of a horizontal rearwardly extending shaft 104 which is supported in trunnions 106, 106 fixed to the table 2. A collar 108 is secured towards the rearward end of the shaft 104, and a torsion spring 110 acting between the collar 108 and one of the trunnions 106 urges the shaft 104 clockwise (viewing FIGURE 2). A pulley 112 is fixed on the shaft 104 and a chain 114 has one end attached to the periphery of the pulley 112 and passes over the pulley to one arm (not shown) of a cam lever 116. This lever is of a shape similar to that of the cam lever 208, and comprises a second arm 118 which is adapted to abut in the operation of the illustrative apparatus against a stop screw 120 screwed into the bar 220 and a third arm 122 which supports a cam roll 124 which bears against the cam 16. The cam 16 is so shaped that in the operation of the illustrative apparatus the device C moves the pad 100 anticlockwise (viewing FIGURE 2) to pick up slip from a tank 126 which is fixed to the table 2 and contains a quantity of slip, clockwise to an upright position (FIGURE 2), anticlockwise to apply slip to the end portions of a trimmed blank in the mould M, and clockwise again to its upright position (see FIGURE 11).

The handle applying device D of the illustrative apparatus comprises the attaching mould M which is adjustably secured to a member 130 by bolts 132 (FIGURES 1, 2, 5, 6 and 7). The member 130 is clamped by a bolt 134 to a rod 136 which has its rearward end pivoted at 139 to the head frame 28. A lug 138 fixed to the rod 136 is adapted to engage, in the operation of the illustrative apparatus, a bolt 140 secured in the frame 28, this bolt 140 acting as a stop. Secured to a mid portion of a rod 136 is a cranked arm 142, on a lower end portion of which is mounted a cam roll 144 which engages the cam 14. The cam 14 has attached to it a pneumatic tyred wheel 146, the purpose of which will become apparent hereinafter.

The mould M is movable between its open condition and its closed condition and comprises a fixed mould portion 148 and a movable mould portion 150 hinged to the fixed portion 148 at 152. A torsion spring 154 (FIGURE 1) urges the portion 150 into an open position the mould M then being in its open condition (as shown in FIGURES 2, 5, 6 and 7). The fixed mould portion 148 comprises a rubber pad 156 which is secured in a holder 158 and a latch 160 pivoted to the holder 158. The movable mould portion 150 comprises a rubber pad 162, having a cavity 164 of a shape adapted fairly loosely to hold a handle blank, the pad being fixed in a holder 166. A trip lever 168 is fixed to the holder 166, and another trip lever 170 is freely supported on the lever 168 by a pin 172. A lug portion 174 limits movement of the lever 170 relative to the lever 168.

The latch 160 is adapted, in the operation of the illustrative apparatus to engage a pin (not shown) fixed in the holder 166.

The illustrative apparatus also comprises mould opening and closing mechanism (FIGURES 1, 2 and 5) which comprises a vertical shaft 176 which is mounted for sliding movement in a sleeve 177 fixed in a bracket 178 and to the frame 28. A spring 180 acting between the bracket 178 and a fitting 182 fixed to the shaft 176 towards the lower end thereof, acts to urge the shaft downwards. A collar 184 fixed to the shaft acts to limit downward movement of the shaft. The fitting 182 also supports a cam roll 186 which is adapted to be engaged in the operation of the illustrative apparatus, by the cam 14. Fixed to the shaft 176 is a trip 190. Fixed to the sleeve 177 is a trip member 188.

In the operation of the illustrative apparatus the handle applying device D operates as follows. After a handle has just been affixed to a cup body portion in a handle affixing operation (FIGURES 1 and 2 and at 0° in FIGURE 11) rotation of the cam 14 allows the mould M, in its open condition, to move downwards about its pivot 139. As the mould M moves downwards the lever 170 contacts the trip member 188 and moves freely about its pivot 172 and past the member 188. The mould M then moves down into a lowermost position (FIGURE 5) and then up again into a handle receiving position, in which latter position it receives a trimmed handle blank into the cavity 164 of the pad 162, from the trimming device B which has rotated through 90° from its position (as shown in FIGURE 1). The mould M then moves up a little past the trimming device B to ensure separation of the blank from the device B and then down again into its lowermost position where the slip applying device C applies slip to the end portions of the trimmed blank (FIGURE 7). The mould M then begins to move up again towards the cup chuck E, and as it does so the lever 170 again contacts the trip member 188, which on this occasion, because of the lug 174 engaging the lever 168, causes the lever 170 to rotate the portion 150, with the trimmed handle in the cavity 164 to bring the pads 162 and 156 into contact, holding the trimmed blank end portions uppermost between them. The latch 160 engages the pin in the holder 166 and holds the two mould portions 148 and 150 together the mould M now being in its closed condition. While the cam 14 is causing the mould M to move upwards, the cam roll 186 also comes into contact with another portion of the cam, causing the rod 176 and the trip member 190 to move upwards against the action of the spring 180. The mould M eventually reaches its uppermost position, and presses the end portions of the trimmed blank against a cup body portion on the cup chuck E to attach the handle thereto. While the mould M is in this uppermost, handle-attaching, position resilient pressure is exerted by the pneumatic tyred wheel 146 bearing against the cam roll 144 to press the handle blank against the cup body portion firmly to affix it thereto. While the mould M is still in its uppermost position the rod 176 is moved down again by the spring 180, and the trip member 190 contacts the latch 160, releasing it from the pin in the portion 150 and allowing the spring 154 to move the portion 150 into its open position away from the attached handle.

The cup chuck E of the illustrative apparatus (FIGURE 9) is mounted on an adjustable mounting to allow it to be used with various shapes and sizes of cup body portions. A shaft 300 is fixed to the frame 28 and a sleeve 302 is mounted on it and can be adjusted vertically on the shaft and clamped in position. Rotatably mounted in an upper end portion of the sleeve 302 is an adjusting screw 304 which is adapted to engage in a threaded hole 306 in the shaft 300. A locking device 308 is adapted to lock the sleeve 302 in position on the shaft 300 when such position has been adjusted by means of the screw 304. A horizontal shaft 310 is mounted in a side arm 312 of the sleeve 302 and in the operation of the illustrative apparatus is locked in position by a locking device 314. The shaft 310 comprises two vertical bores 316, 318, and two horizontal transverse bores 320, 322 passing through the bores 316, 318 respectively. In the bore 320 is positioned an internally threaded plug 324, and a similar plug 326 is positioned in the bore 322. A channel member 328 extends forwardly of the illustrative apparatus and is mounted on the shaft 310 by means of two adjusting screws 330, 332; the adjusting screw 330 has a collar 334 which engages the member 328, and a stem 336 which is screwed into the plug 324. The adjusting screw 332 has a stem 338 which is screwed into the plug 326, and a spring 340 which acts between the member 328 and the shaft 310 surrounds the stem 338. A bracket 342 is adjustably mounted adjacent the forward end of the member 328 by means of an adjusting screw 344: the bracket 342 supports a threaded rod 346 which itself supports the cup chuck E. A clamp screw 350 serves to clamp the rod 346 in position.

Coarse adjustment of the position of the chuck E relative to the rest of the illustrative apparatus may be effected by adjustment of the screw 304 and of the position of the shaft 310 in the side arm 312; fine adjustment may be effected by adjustment of the screws 330, 332 either together or separately, and also by adjustment of the position of the threaded rod 346 in the bracket 342.

The operation of the illustrative apparatus in applying a handle to a cup body portion will now be described with particular reference to FIGURE 11.

It will be understood that before the illustrative apparatus is used to attach a handle blank to a cup body portion the apparatus must be correctly adjusted. Firstly, correctly shaped rubber pads 162 and 156 must be fitted in the mould M, secondly a correctly shaped positioning mould 30 must be fitted in the handle presenting device A and thirdly a chuck E of the correct shape and size must be mounted on the illustrative apparatus. The angle of the blades 4 of the trimming device must then be so adjusted that the end portions of a handle blank are correctly trimmed for application to a cup body portion: it is sometimes necessary to adjust the slip applying device should the handle blank be of unusual shape. It will be realized that the pads 156 and 162 of the mould M are shaped to have contours corresponding to that of the outside of the cup body portion to facilitate application of a trimmed blank to the body portion.

Figure 2:
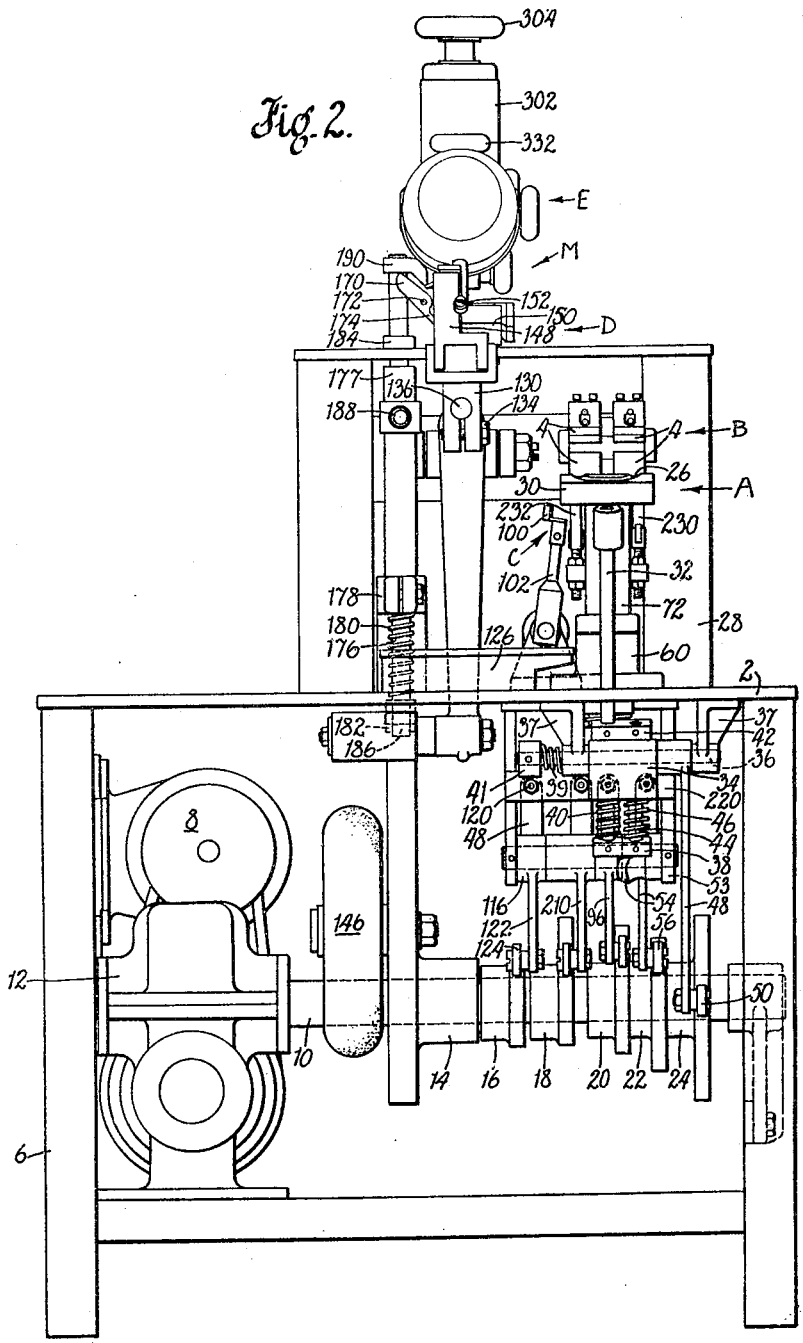
FIGURE 2 shows a front view of the illustrative apparatus.

At 0° on FIGURE 11, the illustrative apparatus is in the condition shown in FIGURES 1 and 2, with a blank having just been applied to a cup body portion and an untrimmed blank supported in the trimming device B. An operator now positions an untrimmed blank in the recess 26 of the positioning mould 30, and as the mould M moves downward away from the chuck E, removes from the chuck E the cup body portion which has had a blank applied to it and positions an unhandled cup body portion on the chuck.

Figure 5:
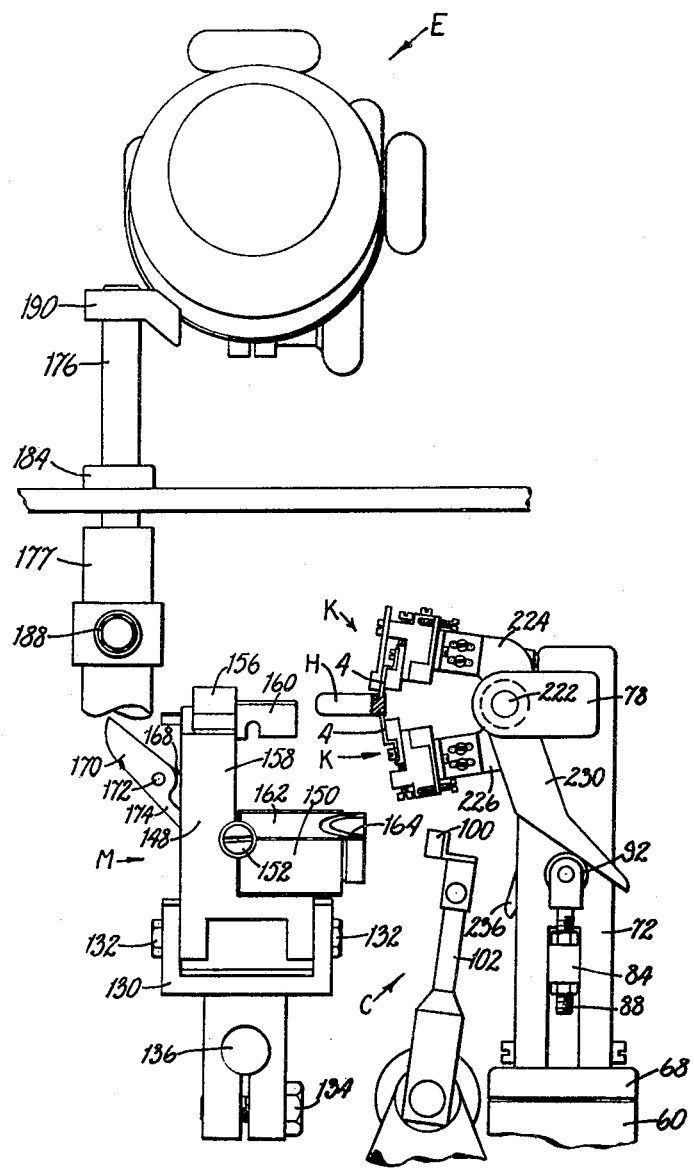
FIGURES 5, 6 and 7 show views of a handle applying device and of the trimming device of the illustrative apparatus at three different stages of operation.
Figure 6:
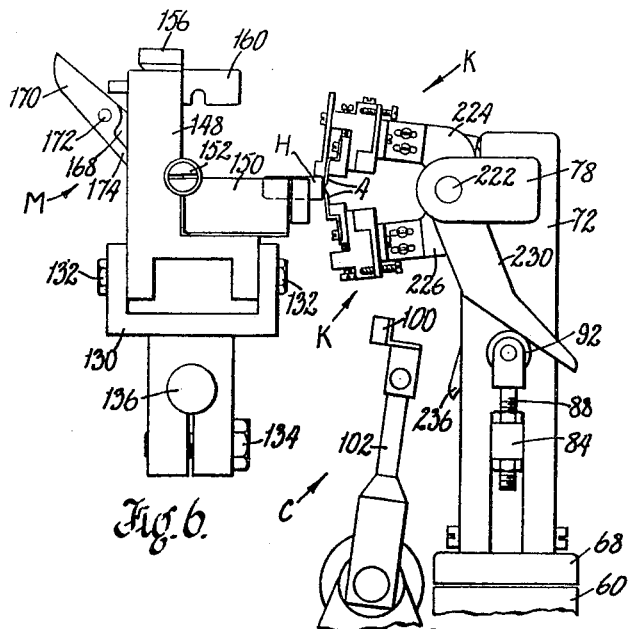

At the beginning of the cycle of operation (as shown in FIGURE 11) the handle presenting device A moves inwards from its loading position to its presenting position to position the untrimmed handle blank located therein in a position where it can be engaged by the trimming device B. While this is happening the cam 14 causes the handle applying device D to move the mould M, which is in its open condition, downwards to its lowermost position, and the trimming device B, with the untrimmed handle blank H supported therein, is caused to rotate about a vertical axis by the action of the cam 18 to position the handle blank over the cavity 164 of the rubber pad 162 (FIGURE 5, 90° in FIGURE 11). The mould M is now caused to move upwards, and as it does so the blades 4 of the trimming device B are caused to close on each other, thus severing the blank and trimming the end portions thereof as the pad 162 moves past the device B and the trimmed blank is positioned in the cavity 164 (FIGURE 6, 136° in FIGURE 11). Movement of the pad 162 upwards a little past the blades 4 ensures separation of the trimmed blank from the trimming device B. When the trimmed handle has been positioned in the cavity 164 the blades 4 are caused fully to open one away from the other (175° in FIGURE 11), and at the same time the trimming device rotates so as to face the presenting device A (208° in FIGURE 11). Meanwhile the mould M is again moved down into its lowermost position and the slip applying device C, which has a coating of slip on the pad 100, is caused to move in and apply a small amount of slip to the end portions of the trimmed blank in the cavity 164 (FIGURE 7, 190° in FIGURE 11). The slip applying device C then moves away, and the mould M begins to move up towards the cup chuck E (c. 200° in FIGURE 11). As the mould M moves upward (at about 247° in FIGURE 11) the trip lever 170 contacts the trip member 188 and the movable mould portion 150 is moved into contact with the fixed mould portion 148, thus to close the mould M. It will be realized that the end portions of the trimmed handle with slip applied thereto now face upwards in the mold M, and that the latch 160 operates to hold the two mould portions in engagement with each other. While the mould M is being closed the vertical shaft 176 and the trip member 190 are also caused to move up into an uppermost position by the cam 14 (275° in FIGURE 11). The trimmed blank is then applied to the cup body portion on the cup chuck E and pushed against it securely to affix it thereto by resilient pressure obtained by the action of the tyred wheel 146. The shaft 176 then moves downwards, the member 190 knocks against the latch 160 and the spring 154 causes the portion 150 to move away from the portion 148 leaving the trimmed blank affixed to the cup body portion.

It will be noted from FIGURE 11 that while the mould M is moving upwards to apply the blank to the cup body portion the presenting device A has presented the blank in the mould 30 to the trimming device B. At 158° in FIGURE 11 the device A begins to move upwards, and in combination with the rotation of the trimming device B (176° to 206° in FIGURE 11) locates the blank between the fully open blades 4 (FIGURE 8, 230° in FIGURE 11). The blades 4 are now caused to close to their partly closed position in which they support the handle blank by partial severance thereof (260° in FIGURE 11). The presenting device A now moves downwards, as shown in chain line in FIGURE 8 and then, when clear of the blank, swings back to its loading position. It will be noted from FIGURE 11 that while the device A is returning to its rest position, the slip applying device moves down to the slip tank to obtain slip on the pad 100 and then returns to its rest position. The parts of the illustrative apparatus have now all returned to the positions shown in FIGURES 1 and 2, i.e. 0° on FIGURE 11.

It will be realized that in one cycle of operation of the illustrative apparatus one blank is trimmed by the trimming device B, positioned in the attaching mould M and affixed to a body portion while a succeeding blank is located in the presenting device A and presented to the trimming device B.

Figure 14:
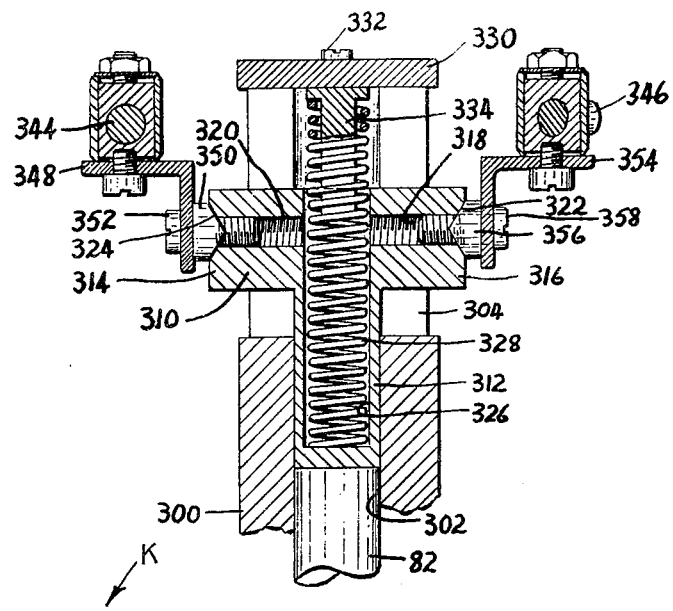
FIGURE 14 shows a view in section taken along the line XIV—XIV of FIGURE 10.

An alternative construction B' of trimming device is shown in FIGURES 12, 13 and 14. A cylindrical supporting member 300 is fixed to the sleeve 58 in place of the hollow supporting member 72, and the actuating rod 82, which no longer has anything fixed to its upper end, moves in a vertical bore 302 of the member 300. The member 300 has a broad slot 304 formed in its upper end.

A supporting block 310 is mounted for up and down movement in the member 300. The block 310 is roughly T-shaped, and comprises a downwardly extending rod 312 and two cross arms 314, 316 which have threaded bores 318, 320 therein, which end in U-shaped grooves 322, 324.

The arms 314, 316 extend outwardly through the slot 304. The rod 312 has a bore 326 therein, and a spring 328 in this bore acts to urge the block 310 downwards.

A plate 330 is fixed to the top of the member 300 by three screws 332. A bar 334 extends downwardly from the plate 330, and the spring 328 is positioned on this bar. A lug 336 extends up from the plate 330, and has a V-shaped groove in its upper end.

Trimming means of the alternative construction B' of the trimming device comprise a trimming block 338 and two trimming blades 340, 340. The block 338 is secured to the lug 336, in such a manner that its position can readily be adjusted. The block 338 is chosen to be of a shape appropriate to the particular handle to be trimmed, and comprises grooves 341, 342, roughly semi-circular in cross section, which are of a shape appropriate to that of the end portion of the handle.

The two blades 340, 340 are each tipped with tungsten outside, and are adjustably attached to rods 344, 346. The rod 344 is adjustably attached to a bracket 348 which has a boss 350 which is held in the groove 324 by a screw 352: the rod 346 is adjustably attached to a bracket 354 which has a boss 356 which is held in the groove 322 by a screw 358. It will be realized that the blades 340 may readily be adjusted up and down, towards and away from each other and towards and away from the support 300.

The operation of the alternative construction B' is similar to that of the trimming device B: it will be realized from the following description that the timing of certain movements may require slight adjustment. An untrimmed handle blank is positioned in the recess 26 of the handle presenting device A, and the mould 30 of the device A moves upwards to bring end portions of the handle blank into the recesses 341, 342. The actuating rod 82 then causes the block 310 to move upwards, and the blades 340, 340 engage the handle blank just adjacent the inward face 360 of the block 340. At this stage the blades 340 cut only a very little way into the handle blank. The mould 30 of the presenting device A is now moved downwards, leaving the handle supported between the block 338 and the blades 340. The trimming device B' now turns through 90°, under the action of the cam 18, to locate the untrimmed handle blank over the cavity 164 of the pad 162. The holder M now moves up against the block 338, and the blades 340 move across the face 360, cutting right through the end portion of the blank thus to trim it and provide a trimmed handle. The holder M, with the trimmed handle in position, now moves down again, and the trimming device returns to its original condition as shown in FIGURE 9.

Figure 15:
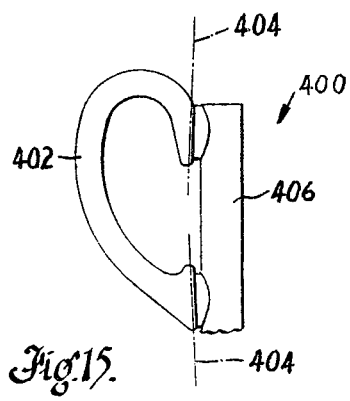
FIGURE 15 shows a handle blank of particular use with the illustrative apparatus.

The illustrative apparatus may readily be used with most usual shapes of cup handle blank, and materially reduces the risk of breakage. However, FIGURE 15 shows a handle blank 400 which is particularly suitable for use in the illustrative apparatus, whether provided with the trimming device B or the alternative construction B'. The handle blank 400 is generally D-shaped, and comprises a C-shaped open handle portion 402 and a supporting bar 406 which extends across the open handle portion. It will be realized that a blank of this shape is very much more resistant to deformation than the more usual C-shaped handle blank. When the blank 400 is used in the illustrative machine it is positioned in the mould 30 of the presenting device A, and is then presented to the trimming device, where the trimming blades (4 or 340) engage the blank at localities 404, at which localities the blank is later trimmed as previously described to provide a trimmed handle 402.

The trimmed handle 402 is then attached to the cup without being further touched by the operator. It will thus be seen that while the blank 400 is handled by the operator it is in a condition in which it is resistant to deformation, and it is not handled at all by the operator after it has been trimmed, thus greatly reducing the risk of deformation or breakage of the handle.

Having thus described my invention what I claim as new and desire to secure by Letters Patent of the United States is:

1. In a machine for applying a handle to a ceramic body, a support for the body, a presenting mold closely receiving an untrimmed handle for accurate positioning of predetermined portions to be trimmed, an attaching mold movable toward and away from the support and loosely receiving said handle to facilitate release from the handle, a trimming device movable between the presenting mold and the attaching mold and adapted to act on said handle for trimming said portions to correspond to the shape of said body, operating means causing said device to sever said portions only sufficiently to grip the untrimmed handle when positioned by the presenting mold, means for moving the trimming device to transport the gripped handle from the presenting mold to the attaching mold, said operating means being effective after the handle is transported to cause the device to complete the severing operation for trimming said portions and depositing the trimmed handle in the attaching mold, and means effective after the handle is deposited for moving the attaching mold toward and then away from said support for attaching the trimmed handle to said body.

2. In a machine for applying a handle to a ceramic body, a support for the body, a presenting mold closely fitting an untrimmed handle for accurate positioning of portions to be trimmed, an attaching mold loosely fitting said handle to facilitate its release from the handle after attachment to said body, a device movable between the presenting mold and the attaching mold, opposed blades carried by said device and adapted to act on said handle for trimming said portions to correspond to the shape of said body, operating means for partially closing said blades on said portions to grip the untrimmed handle when positioned by the presenting mold, means for moving said device to transport the gripped handle from the presenting mold to the attaching mold, said operating means being effective after the handle is transported to complete closing of said blades to sever said portions and cause the trimmed handle to be deposited in the attaching mold, and means effective after the handle is deposited for moving the attaching mold toward and then away from said support for attaching the trimmed handle to said body.

3. In a machine for applying a handle to a ceramic body, a support for the body, a presenting mold having a cavity closely receiving an untrimmed handle and being movable from a loading position where a handle may be placed in the cavity to a presenting position where the handle is accurately located for trimming, an attaching mold having a cavity loosely receiving said handle to facilitate its release, a trimming device movable between the presenting mold and the attaching mold and adapted to act on said handle for trimming predetermined portions of the handle to correspond to the shape of said body, operating means causing said device to sever said portions sufficiently to grip the untrimmed handle when positioned by the presenting mold, means for moving the trimming device to transport the gripped handle from the presenting mold to the attaching mold, said operating means being effective after the handle is transported to cause the device to complete the severing operation for trimming said portions to deposit the trimmed handle in the attaching mold, and means effective after the handle is deposited for moving the attaching mold toward and then away from said support for attaching the trimmed handle to said body.

4. In a machine for applying a handle to a ceramic body, a support for the body, a presenting mold closely fitting an untrimmed handle and movable from a loading position where the handle may be placed therein to a presenting position where said handle is accurately located for trimming, an attaching mold loosely fitting said handle to facilitate its release from the handle after attachment to said body, a trimming device movable between the presenting mold and the attaching mold and having opposed blades adapted to act on said handle for trimming said portions to correspond to the shape of said body, operating means for partially closing said blades on said portions to grip the untrimmed handle when positioned by the presenting mold, means for moving said device to transport the gripped handle from the presenting mold to the attaching mold, said operating means being effective after the handle is transported to complete the closing of said blades to sever said portions and cause the trimmed handle to be deposited in the attaching mold, and means effective after the handle is deposited for moving the attaching mold toward and then away from said support for attaching the trimmed handle to said body.

References Cited in the file of this patent

UNITED STATES PATENTS

| | | |
|---|---|---|
| 854,433 | Rowan | May 21, 1907 |
| 2,902,740 | Knapp | Sept. 8, 1959 |

FOREIGN PATENTS

| | | |
|---|---|---|
| 728,072 | Great Britain | Apr. 13, 1955 |

UNITED STATES PATENT OFFICE
CERTIFICATE OF CORRECTION

Patent No. 3,052,007 September 4, 1962

Arthur Dowley

It is hereby certified that error appears in the above numbered patent requiring correction and that the said Letters Patent should read as corrected below.

Column 4, line 60, for "sleeves" read -- sleeve --; column 5, line 4, for "ilustrative" read -- illustrative --; line 7, strike out "being"; line 14, for "crew" read -- screw --; line 41, for "26" read -- 226 --; line 44, for "226. One of the heads K supporting one of" read -- 224 by two screws 254 passing through slots --; column 6, line 55, for "a" read -- the --.

Signed and sealed this 5th day of March 1963.

(SEAL)
Attest:

ESTON G. JOHNSON
Attesting Officer

DAVID L. LADD
Commissioner of Patents